United States Patent [19]

Kimura et al.

[11] Patent Number: 4,972,001
[45] Date of Patent: Nov. 20, 1990

[54] FOAMING ORGANOPOLYSILOXANE COMPOSITION AND CURED PRODUCT THEREOF

[75] Inventors: Tsuneo Kimura; Yoshio Inoue, both of Gunma, Japan

[73] Assignee: Shin-Etsu Chemical Co., Ltd., Tokyo, Japan

[21] Appl. No.: 494,021

[22] Filed: Mar. 15, 1990

[30] Foreign Application Priority Data

Mar. 16, 1989 [JP] Japan .................................. 64-64482

[51] Int. Cl.$^5$ .............................................. C08V 9/02
[52] U.S. Cl. ...................................... 521/77; 521/122; 521/123; 521/154; 521/913; 521/134
[58] Field of Search .................... 528/31, 33; 521/91, 521/123, 122, 154, 913, 77, 134

[56] References Cited

U.S. PATENT DOCUMENTS

| | | | |
|---|---|---|---|
| 4,024,091 | 5/1977 | Lee et al. | 521/154 |
| 4,026,842 | 5/1977 | Lee et al. | 521/154 |
| 4,631,299 | 12/1986 | Laisney et al. | 521/154 |
| 4,746,334 | 5/1988 | Matsui et al. | 521/154 |
| 4,931,485 | 6/1990 | Inoue et al. | 521/154 |

*Primary Examiner*—Morton Foelak
*Attorney, Agent, or Firm*—Millen, White & Zelano

[57] ABSTRACT

A foaming polysiloxane composition providing excellent expansion ratio and expansion control comprising: (A) 100 parts by weight of an α, ω-dihydroxyorganopolysiloxane, (B) 0.01–50 parts by weight of an organopolyhydroxypolysiloxane, (C) an organopolyhydrogensiloxane wherein 1 molecule contains at least 2 units represented by the general formula:

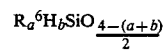

$$R_a{}^6H_b\mathrm{SiO}_{\frac{4-(a+b)}{2}}$$

and in such quantity that SiH lies within the range of 0.5–30 mole per mole of total silanol groups in components A and B, (D) platinum or platinum compounds in a quantity of 0.1–200 ppm calculated as platinum metal per total weight of said components A, B and C, and (E) an organosilicon compound with acetylenic unsaturated groups in a quantity of 0.001–10 parts by weight per 100 parts by weight of components A,B,C and B; and a cured product thereof were disclosed.

16 Claims, No Drawings

FOAMING ORGANOPOLYSILOXANE COMPOSITION AND CURED PRODUCT THEREOF

FIELD OF THE INVENTION

This invention concerns a novel foaming organopolysiloxane composition, and in particular, a room temperature curing type foaming organopolysiloxane composition with improved expansion ratio and property which controls scale and fineness of produced cell (abbreviated as expansion control) and cured product thereof.

BACKGROUND OF THE INVENTION

Procedures used to obtain silicone rubber foams at room temperature are described, for example, in Examined Published Japanese Patent No. 45-12675. Conventionally, these procedures consisted either of methods wherein a foaming agent was added in the process of obtaining an ordinary silicone rubber elastic which cures at room temperature, and methods wherein foaming properties were conferred on the actual curing mechanism of a silicone rubber composition which cures at room temperature. An example of the latter type of method is a dehydrogenation reaction between organosilicon compounds with hydrogen atoms directly bonded to silicon atoms, and organosilicon compounds with hydroxyl groups directly bonded to silicon atoms. This dehydrogenation reaction is catalyzed by, for example, quaternary ammonium salts, heavy metal salts of carboxylic acids and alkali metal alkoxides as disclosed in Examined Published Japanese Patent Nos. 33-9297 and 44-8755; hydroxylamine compounds and organosilicon compounds with aminoxy groups directly bonded to silicon atoms as disclosed in Examined Published Japanese Patent No. 54-9794, or platinum compounds as disclosed in Unexamined Published Japanese Patent No. 51-46352. All these methods however suffered from the disadvantage that expansion rate was low and from the fact that foaming was difficult to control. They are therefore unsuitable if it is desired to obtain high adiabatic efficiency.

As a result of intensive attempts to overcome the above problems, the authors of the present invention discovered that by the addition of organosilicon compounds with acetylenic unsaturated groups to the SiH/SiOH dehydrogenation reaction system, the expansion rate could not only easily be increased, but a foaming organopolysiloxane composition curing at room temperature was obtained of which the expansion be properly controlled

SUMMARY OF THE INVENTION

A first object of the present invention is therefore to provide a foaming organopolysiloxane composition with a high expansion rate of which the expansion can be properly controlled.

A second object of the present invention is to provide a foaming organopolysiloxane composition with a high expansion rate of which the expansion can be properly controlled, and which cures at room temperature.

The above objects of the present invention are provided by a foaming organopolysiloxane composition comprising:

(A) 100 parts by weight of an $\alpha, \omega$-dihydroxyorganopolysiloxane represented by the general formula:

(B) 0.01–50 parts by weight of an organopolyhydroxypolysiloxane represented by the general formula:

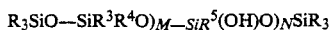

(C) an organopolyhydrogensiloxane wherein 1 molecule contains at least 2 units represented by the general formula:

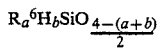

and in such quantity that SiH lies within the range of 0.5–30 mole per mole of total silanol groups in components A and B, (D) platinum or platinum compounds in a quantity of 0.1–200 ppm calculated as platinum metal per total weight of said components A, B and C, and (E) an organosilicon compound with acetylenic unsaturated groups represented by the general formula:

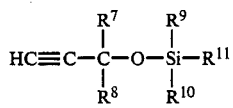

or

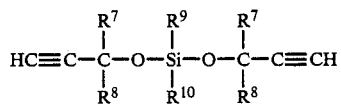

in a quantity of 0.001–10 parts by weight per 100 parts by weight of components A, B, C and D.

Polysiloxane composition of the present invention can be cured at room temperature easily when they are mixed together and cured product thereof with an excellent adiabatic efficiency can be obtained, since the composition can realize an improved expansion ratio and expansion control.

DETAILED DESCRIPTION OF THE INVENTION

The degree of polymerization L of the $\alpha, \omega$-dihydroxyorganopolysiloxane of general formula

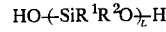

used as component A in this invention must lie in the range 200–3,000, and should preferably lie in the range 300–2,000, in order to confer mechanical strength on the polysiloxane foam after curing. If L is less than 200, the foam has insufficient elongation after curing, and if L is greater than 3,000, the foam becomes difficult to handle.

$R^1$ and $R^2$ respectively, are dissimilar or identical, substituted or unsubstituted monovalent hydrocarbon groups with 1-10 carbon atoms, excluding aliphatic unsaturated hydrocarbon groups. Examples of such groups are alkyl groups such as methyl, ethyl, propyl, butyl, pentyl and hexyl; aryl groups such as phenyl, tolyl and naphthyl; and substituted monovalent hydrocarbon groups such as chloromethyl and 3,3,3 trifluoropropyl. $R^1$ and $R^2$ may be similar or dissimilar. In particular, from the viewpoints of ease of procurement and viscosity of the composition, it is preferable that $R^1$ and $R^2$ are both methyl groups.

The hydroxyl groups of component B used in this invention increase the expansion ratio of the foaming organopolysiloxane composition, and also provide good foaming control by conferring thixotropic properties on the composition. Component B is an organopolyhydroxy. polysiloxane represented by the general formula;

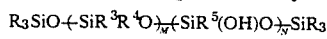

R, $R^3$, $R^4$ and $R^5$ are same to above mentioned $R^1$ and $R^2$ in the component A, namely, dissimilar or identical, substituted or unsubstituted monovalent hydrocarbon groups with 1-10 carbon atoms, excluding aliphatic unsaturated hydrocarbon groups. From the viewpoints of ease of procurement and viscosity of the composition, it is preferable that R, $R^3$, $R^4$ and $R^5$ are all methyl groups.

M is an integer from 2-20, and N is an integer from 3-20, and it is desirable that M+N is in the range 10-40. It is in particular preferable that M and/or N are in the range 10-20. If N is less than 3, the expansion ratio declines, and the foaming organopolysiloxane composition which cures at room temperature with an excellent expansion ratio, which is the object of this invention, is not obtained.

Further, it is preferable that the ratio M/N is not less than 1. If the ratio M/N is less than 1, the silanol groups in the $-(SiR^5(OH)O)_N-$ are relatively unstable, and it is difficult to obtain a stable expansion ratio with expansion control.

The quantity of component 8 added with respect to 100 parts by weight of component A is 0.01-50 parts by weight, and preferably 1-20 parts by weight. If the quantity of component B added is less than 1 part by weight, the expansion ratio declines, and the foaming polysiloxane composition which cures at room temperature with an excellent expansion ratio, which is the object of this invention, is not obtained. Further, if the quantity is greater than 50 parts by weight, the polysiloxane foam has insufficient mechanical strength.

Component C used in this invention is a component with hydrogen atoms directly bonded to silicon atoms. It enters into a dehydrogenation reaction with organosilicon compounds having hydroxyl groups directly bonded to silicon atoms in components A and B, thereby producing hydrogen gas and crosslinking. This component C is a organopolyhydrogensiloxane wherein 1 molecule contains at least 2 units represented by the general formula;

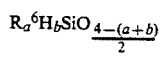

In this formula, a is an integer chosen from 0,1 or 2; b is an integer chosen from 1, 2 or 3; and a+b is an integer chosen from 1, 2 or 3. $R^6$ is same to before mentioned $R^1$ and $R^2$ of the component A, namely, a monovalent hydrocarbon group with 1-10 carbon atoms excluding aliphatic unsaturated hydrocarbon groups. Specifically, $R^6$ may be alkyl groups with 1-6 carbon atoms such as methyl, ethyl, propyl, pentyl and hexyl. From the viewpoint of ease of procurement, it is particularly preferable that $R^6$ is methyl group.

Another units other than above mentioned unit represented by said general formula in the component C can be selected from a group of $R_3^6SiO_{0.5}$, $R^6SiO$ and $R^6SiO_{1.5}$, wherein $R^6$ is same to above $R^6$ and methyl group is desirable one.

The hydrogen atoms directly bonded to silicon atoms may be situated at the end of the molecule or in a main chain or side chain, and the molecular structure may be a linear, cyclic or branched.

Specific examples of the organopolyhydrogensiloxane which is the component C are as follows;

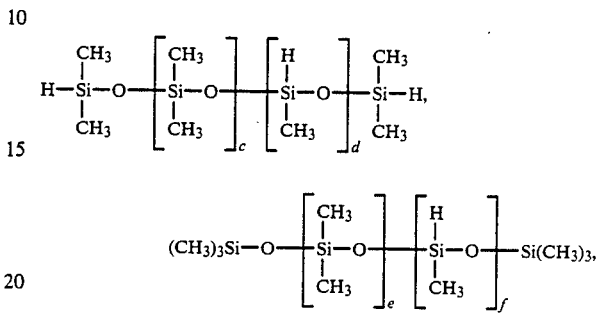

where c, d and e are integers of 0-100 and f is integer of 2-100;

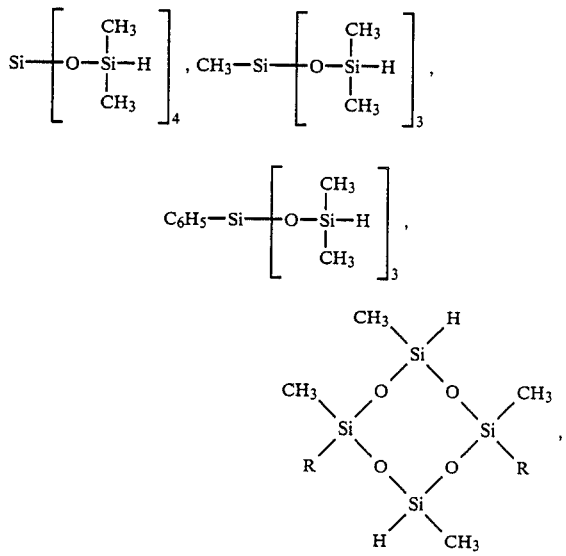

wherein R represents a hydrogen atom, methyl, ethyl, propyl or trimethylsyloxy group; and

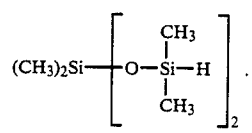

The quantity of component C used must be such that the quantity of SiH groups lies in the range 0.5 mole-30 mole, and is preferably such that it lies in the range 2-20 mole, per mole of total silanol groups in components A and B. If it is less than 0.5 mole, it is not possible to provide a foaming polysiloxane composition which cures at room temperature with an excellent expansion ratio and expansion control, while if it is greater than 30 mole, the polysiloxane foam has insufficient strength.

Component D used in this invention is platinum or a platinum compound which promotes the dehydrogenation reaction between component A or B and component C. Examples of such compounds are platinum metal, chloroplatinic acid, complexes of platinum with olefinic compounds, complexes of platinum with silanes or siloxanes containing vinyl groups, and compounds of platinum with phosphates. Of these, from the viewpoints of stability of the composition before curing and conferring a suitable expansion ratio, chloroplatinic acid and complexes of platinum with olefinic compounds are to be preferred. The quantity of component D used is 0.1–200 ppm, and preferably 1–50 ppm, calculated as platinum with respect to the total quantity of said components A, B and C. If the quantity is less than 0.1 ppm, the dehydrogenation reaction proceeds slowly; if on the other hand it is greater than 200 ppm, the results obtained are not particularly improved, hence the addition of such a quantity is uneconomical.

Component E used in this invention is a substance commonly used as a retarder of addition type RTV organosiloxane composition and is represented by the general formulae:

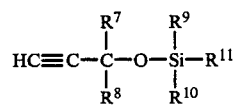

or

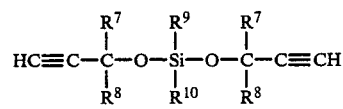

In these formulae, $R^7$, $R^8$, $R^9$, $R^{10}$ and $R^{11}$ are all independent hydrogen atoms or aliphatic monovalent hydrocarbon groups with 1–10 carbon atoms, examples of the latter being alkyl groups such as methyl, ethyl, propyl and butyl; aryl groups such as phenyl and tolyl; and alkenyl groups such as vinyl and allyl. This acetylene alcohol derivative helps to control the SiH/SiOH dehydrogenation reaction of this invention and improves foaming control, and concurrent use of this component is therefore the most important feature of the invention.

Specific examples of component E are as follows:

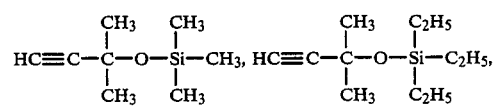

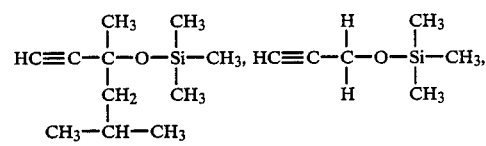

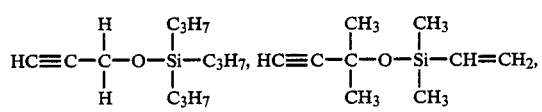

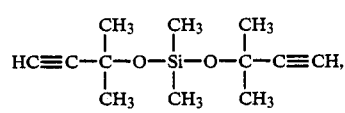

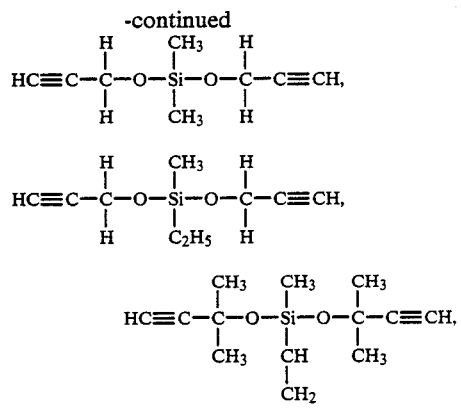

The quantity of this organosilicon compound added is 0.001–10 parts by weight, and preferably 0.001–1.0 parts by weight, with respect to 100 parts by weight of components A, B, C and D. If the quantity is less than 0.001 parts by weight, the viscosity of the composition of this invention increases considerably in a short time so that ease of handling declines; while if it is greater than 10 parts by weight, the curing properties of the composition deteriorate considerably.

In this invention, vinyl-containing low molecular weight siloxanes may also be used as control agents, but they are somewhat inferior to acetylene alcohol derivatives in so far as concerns expansion control properties.

Polyorganosiloxanes wherein both ends are or one end of the molecule is terminated with a triorganosilyl group or silanes with vinyl groups and siloxanes, may be added as diluents, and fillers, pigments, coloring agents, agents to improve heat resistance and flame retardants may also be added if necessary to the novel foaming organopolysiloxane composition of this invention, provided that such additives do not detract from the object of the invention.

EXAMPLES

We shall now describe this invention in more detail with reference to specific examples, but it should be understood that the invention is in no way limited to them.

EXAMPLE 1

An α, ω-dihydroxyorganopolysiloxane represented by the average structural formula:

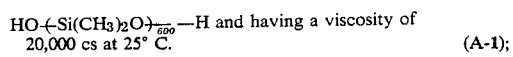

an organopolyhydroxypolysiloxane represented by the average structural formula:

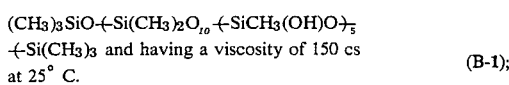

a polyorganohydrogensiloxane represented by the average structural formula:

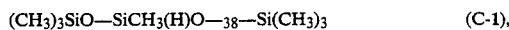

an isopropyl alcohol solution containing 2% of chloroplatinic acid (D-1), and a silicon compound (E-1) with acetylenic unsaturated groups represented by the structural formula:

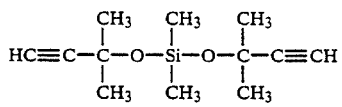

were mixed at 20° C. in the proportions shown in Table 1 to obtain Samples 1-3.

Table 1 also shows the expansion ratios and expansion control properties of each sample.

Sample 1 is a comparison sample.

TABLE 1

| Component (parts by weight) | 1 | 2 | 3 |
|---|---|---|---|
| A - 1 | 100 | 100 | 100 |
| B - 1 | 0 | 2.5 | 5 |
| C - 1 | 10 | 10 | 10 |
| D - 1 | 0.7 | 0.7 | 0.7 |
| E - 1 | 0.02 | 0.02 | 0.02 |
| Expansion Ratio (times) | 1.3 | 2.5 | 5.3 |
| Expansion Control | bad | good | good |

As is clear from the results of Table 1, the use of an organopolyhydroxypolysiloxane(component B-1) improves expansion control properties.

EXAMPLE 2

A-1-E-1 which were used in Example 1, and an dihydroxydimethylpolysiloxane (A-2) represented by the average structured formula: $HO\text{-}(Si(CH_3)_2O)_{\overline{15}}H$ and having a viscosity of 30 cs at 25° C., were mixed at 20° C. in the proportions shown in Table 2 to obtain Samples 4-8.

Table 2 also shows the expansion ratio, thixotropic properties and expansion control properties of each sample.

Samples 4 and 8 are comparison samples.

TABLE 2

| Component (parts by weight) | 4 | 5 | 6 | 7 | 8 |
|---|---|---|---|---|---|
| A - 1 | 100 | 100 | 100 | 100 | 100 |
| A - 2 | 0 | 0 | 0 | 0 | 2.5 |
| B - 1 | 0 | 2.5 | 5 | 10 | 0 |
| C - 1 | 10 | 10 | 10 | 10 | 10 |
| D - 1 | 0.7 | 0.7 | 0.7 | 0.7 | 0.7 |
| E - 1 | 0.02 | 0.02 | 0.02 | 0.02 | 0.02 |
| Aerosol silica | 5 | 5 | 5 | 5 | 5 |
| Expansion Ratio (times) | 1.4 | 3.1 | 5.2 | 7.2 | 2.5 |
| Thixotropic property* | 1.04 | 1.64 | 1.59 | 1.53 | 1.00 |
| Expansion Control | bad | good | good | good | bad |

*Ratio of (viscosity at 4 rpm (20° C.)/viscosity at 20 rpm (20° C.)) using rotor No. 6 of BH type rotory viscometer.

As is clear from the results of Table 2, the use of an organopolyhydroxypolysiloxane (component B-1) improves the expansion ratio, and also improves expansion control.

Further, it was found that if component B-1 was replaced by the α, ω-dihydroxydimethylpolysiloxane (component A-2), thixotropic properties were low, while expansion ration and expansion control both declined.

EXAMPLE 3

A-1-E-1 which were used in Example 1 and the following disiloxane compound (E-2) containing a vinyl group;

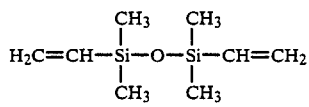

were mixed at 20° C. in the proportions shown in Table 3 to obtain Samples 9-12.

Table 3 shows the time during which the samples obtained may be used (usable time), together with the results for expansion ration and expansion control.

TABLE 3

| Component (parts by weight) | 9 | 10 | 11 | 12 |
|---|---|---|---|---|
| A - 1 | 100 | 100 | 100 | 100 |
| B - 1 | 2 | 2 | 2 | 2 |
| C - 1 | 10 | 10 | 10 | 10 |
| D - 1 | 0.7 | 0.7 | 0.7 | 0.7 |
| E - 1 | 0 | 0.02 | 0.05 | 0 |
| E - 2 | 0 | 0 | 0 | 1 |
| Usable time (min.) | 0.2 | 5 | 15 | 15 |
| Expansion Ratio (times) | 3.0 | 3.1 | 3.0 | 3.0 |
| Expansion Control | good | good | good | bad |

Samples 9 and 12 are comparison samples.

As is clear from the results of Table 3, the organosilicon compound with acetylenic unsaturated groups (E-1) plays an extremely significant role in enabling the composition of the invention to attain satisfactory results for usable time, expansion ration and expansion control.

What is claimed is:

1. A foaming organopolysiloxane composition comprising:

(A) 100 parts by weight of an α,ω-dihydroxyorganopolysiloxane represented by the general formula:

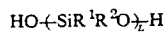

wherein $R^1$ and $R^2$ respectively are dissimilar or identical substituted or unsubstituted monovalent hydrocarbon groups with 1-10 carbon atoms, excluding aliphatic unsaturated hydrocarbon groups, L represents an integer from 200–3,000;

(B) 0.01-50 parts by weight of an organopolyhydroxypolysiloxane represented by the general formula:

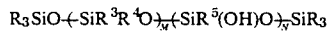

wherein R, $R^3$, $R^4$ and $R^5$ are dissimilar or identical, substituted or unsubstituted monovalent hydrocarbon groups with 1-10 carbon atoms, excluding aliphatic unsaturated hydrocarbon groups, M is an integer from 2-20, and N is an integer from 3-20;

(C) an organopolyhydrogensiloxane wherein 1 molecule contains at least 2 units represented by the general formula:

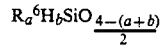

and in such quantity that SiH lies within the range of 0.5-30 mole per mole of total silanol groups in components A and B; in the formula, $R^6$ is a monovalent hydrocarbon group with 1-10 carbon atoms excluding aliphatic unsaturated hydrocarbon groups, a is an integer chosen from 0,1 or 2; b is an integer chosen from 1, 2 or 3; and a+b is an integer chosen from 1, 2 or 3;

(D) platinum or platinum compounds in a quantity of 0.1-200 ppm calculated as platinum metal per total weight of said components A, B and C, and (E) an organosilicon compound with acetylenic unsaturated groups represented by the general formula:

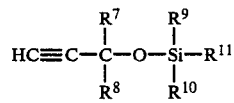

or

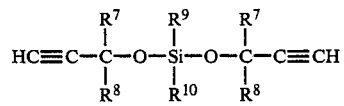

in a quantity of 0.001-10 parts by weight per 100 parts by weight of components A, B, C and D; in these formulae, $R^7$, $R^8$, $R^9$, $R^{10}$ and $R^{11}$ are all independent hydrogen atoms or aliphatic monovalent hydrocarbon groups with 1-10 carbon atoms.

2. The foaming polysiloxane composition of claim 1, wherein $R^1$ and/or $R^2$ in the component (A) are methyl group.

3. The foaming polysiloxane composition of claim 1, wherein L is in the range 300-2,000.

4. The foaming polysiloxane composition of claim 1, wherein all of R, $R^3$, $R^4$ and $R^5$ in the component (B) are methyl group.

5. The foaming polysiloxane composition of claim 2, wherein all of R, $R^3$, $R^4$ and $R^5$ in the component (B) are methyl group.

6. The foaming polysiloxane composition of claim 1, wherein M+N is in the range 10-40.

7. The foaming polysiloxane composition of claim 1, wherein M and/or N are in the range 10-20.

8. The foaming polysiloxane composition of claim 1, wherein the ratio M/N is not less than 1.

9. The foaming polysiloxane composition of claim 1, wherein the quantity of component B added with respect to 100 parts by weight of component A is 1-20 parts by weight.

10. The foaming polysiloxane composition of claim 1, wherein $R^6$ in the component (C) is methyl group.

11. The foaming polysiloxane composition of claim 1, wherein the quantity of component C lies in the range 2-20 mole per mole of total silanol groups in component A and B.

12. The foaming polysiloxane composition of claim 1, wherein the platinum compounds of component D is a chloroplatinic acid or complexes of platinum with olefinic compounds.

13. The foaming polysiloxane composition of claim 1, wherein the quantity of component D used is 1-50 ppm, calculated as platinum with respect to the total quantity of said components A, B and C.

14. The foaming polysiloxane composition of claim 1, wherein the quantity of the component E is 0.001-1.0 with respect to the total weight of components A, B, C and D.

15. A cured product obtained by curing the foaming polysiloxane composition of claim 1.

16. A method for producing a cured foamed polysiloxane which comprises the steps of (a) mixing (A) 100 parts by weight of an α,ω-dihydroxyorganopolysiloxane represented by the general formula:

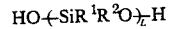

wherein $R^1$ and $R^2$ respectively are dissimilar or identical, substituted or unsubstituted monovalent hydrocarbon groups with 1-10 carbon atoms, excluding aliphatic unsaturated hydrocarbon group and L represents an integer from 200-3,000;

(B) 0.01-50 parts by weight of an organopolyhydroxypolysiloxane represented by the general formula:

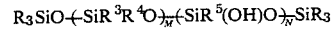

wherein R, $R^3$, $R^4$ and $R^5$ are dissimilar or identical, substituted or unsubstituted monovalent hydrocarbon groups with 1-10 carbon atoms, excluding aliphatic unsaturated hydrocarbon groups, M is an integer from 2-20, and N is an integer from 3-20;

(C) and organopolyhydrogensiloxane wherein 1 molecule contains at least 2 units represented by the general formula:

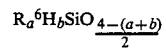

and in such quantity that SiH lies within the range of 0.5-30 mole per mole of total silanol groups in components A and B; in the formula, $R^6$ is a monovalent hydrocarbon group with 1-10 carbon atoms excluding aliphatic unsaturated hydrocarbon groups, a is an integer chosen from 0, 1 or 2; b is an integer chosen from 1, 2 or 3; and a+b is an integer chosen from 1, 2 or 3;

(D) platinum or platinum compounds in a quantity of 0.1-200 ppm calculated as platinum metal per total weight of said components A, B and C, and (E) and organosilicon compound with acetylenic unsaturated groups represented by the general formula

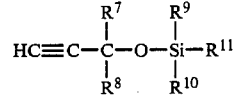

or

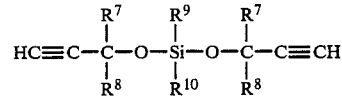

in a quantity of 0.001-10 parts by weight per 100 parts by weight of components A, B, C and D; in these formulae, $R^7$, $R^8$, $R^9$, $R^{10}$ and $R^{11}$ are all independent hydrogen atoms or aliphatic monovalent hydrocarbon groups with 1-10 carbon atoms, and (b) allowing the resulting mixture to foam and cure.

* * * * *